(12) United States Patent
Thiel

(10) Patent No.: US 12,114,099 B2
(45) Date of Patent: Oct. 8, 2024

(54) DYNAMIC CAMERA VIEWS IN A VIRTUAL ENVIRONMENT

(71) Applicant: Zoom Video Communications, Inc., San Jose, CA (US)

(72) Inventor: Jordan Thiel, Leander, TX (US)

(73) Assignee: Zoom Video Communications, Inc., San Jose, CA (US)

(*) Notice: Subject to any disclaimer, the term of this patent is extended or adjusted under 35 U.S.C. 154(b) by 252 days.

(21) Appl. No.: 17/515,495

(22) Filed: Oct. 31, 2021

(65) Prior Publication Data

US 2023/0137265 A1 May 4, 2023

(51) Int. Cl.
| | | |
|---|---|---|
| *H04N 7/14* | (2006.01) | |
| *G06T 15/20* | (2011.01) | |
| *G06T 19/00* | (2011.01) | |
| *H04N 7/15* | (2006.01) | |

(52) U.S. Cl.
CPC ............. *H04N 7/157* (2013.01); *G06T 15/20* (2013.01); *G06T 19/006* (2013.01)

(58) Field of Classification Search
CPC ........ H04N 7/157; G06T 15/20; G06T 19/006
USPC ...................................................... 348/14.08
See application file for complete search history.

(56) References Cited

U.S. PATENT DOCUMENTS

| | | | |
|---|---|---|---|
| 5,850,352 A * | 12/1998 | Moezzi | ................ H04N 13/246 348/E13.058 |
| 10,205,910 B2 | 2/2019 | Valli | |
| 10,403,050 B1 | 9/2019 | Beall et al. | |
| 10,701,318 B2 * | 6/2020 | Valli | ....................... H04N 7/157 |
| 11,184,362 B1 * | 11/2021 | Krol | ....................... H04N 7/157 |
| 11,733,826 B2 | 8/2023 | Thiel | |
| 2012/0050323 A1 | 3/2012 | Baron, Jr. et al. | |
| 2013/0249947 A1 * | 9/2013 | Reitan | ................... G06T 19/006 345/633 |
| 2013/0275231 A1 | 10/2013 | Paharia | |
| 2015/0091891 A1 | 4/2015 | Raheman et al. | |
| 2018/0118130 A1 | 5/2018 | Karabed | |
| 2018/0205888 A1 | 7/2018 | Tsukahara | |
| 2019/0018364 A1 | 1/2019 | Kim | |
| 2019/0065027 A1 * | 2/2019 | Hauenstein | ......... G06F 3/04815 |
| 2019/0253667 A1 | 8/2019 | Valli | |

(Continued)

FOREIGN PATENT DOCUMENTS

WO      2019199569 A1      10/2019

OTHER PUBLICATIONS

International Search Report and Written Opinon mailed on Mar. 2, 2023 in corresponding PCT Application No. PCT/US2022/048343.

(Continued)

*Primary Examiner* — Binh Kien Tieu
(74) *Attorney, Agent, or Firm* — Young Basile Hanlon & MacFarlane, P.C.

(57) ABSTRACT

Methods, systems, and apparatus, including computer programs encoded on computer storage media relate to a method for providing dynamic camera views in a virtual environment. The system may provide a video conference session in a virtual environment. The system may provide a plurality of individual virtual cameras for capturing individual video streams of one or more 3D avatars and an environment virtual camera for capturing an environment video stream. The system may display the individual video streams and environment video stream in a video conference application.

20 Claims, 14 Drawing Sheets

(56) References Cited

U.S. PATENT DOCUMENTS

| | | | |
|---|---|---|---|
| 2019/0355179 A1 | 11/2019 | Bortolini et al. | |
| 2020/0294317 A1 | 9/2020 | Segal | |
| 2020/0322395 A1* | 10/2020 | Copley | H04N 7/157 |
| 2020/0402315 A1 | 12/2020 | Yerli | |
| 2022/0086203 A1* | 3/2022 | Morris | H04N 7/157 |
| 2022/0157342 A1 | 5/2022 | Kliushkin et al. | |
| 2022/0286657 A1 | 9/2022 | Oz et al. | |
| 2022/0413433 A1 | 12/2022 | Parra Pozo et al. | |
| 2023/0403367 A1* | 12/2023 | Hassan | G06F 3/04845 |

OTHER PUBLICATIONS

Cha Zhang et al: "Viewport : a Distributed, Immersive Teleconferencing System with Infrared Dot Pattern", IEEE Multimedia, IEEE Service Center, New York, NY, US, vol. 20, No. 1, Jan. 1, 2013 (Jan. 1, 2013), pp. 17-27, XP011493977, ISSN: 1070-986X, DOI: 10.1109/MMUL.2013.12 the whole document.

Fuchs Henry et al: "Immersive 3D Telepresence", IEEE Computer Society, IEEE, USA, vol. 47, No. 7, Jul. 1, 2014 (Jul. 1, 2014), pp. 46-52, XP011554133, ISSN: 0018-9162, DOI: 10.1109/MC.2014. 185 [retrieved on Jul. 22, 2014] the whole document.

Square, "What's the Difference Between and SDK and an API?" https://squareup.com/US/en/townsquare/sdk-vs-api, 2020. (Year: 2020).

\* cited by examiner

DYNAMIC CAMERA VIEWS IN A VIRTUAL ENVIRONMENT

FIELD

This application relates generally to video communications, and more particularly, to systems and methods for displaying users in a virtual environment on a video communications platform.

SUMMARY

The appended claims may serve as a summary of this application.

DETAILED DESCRIPTION OF THE DRAWINGS

Figure 1A:
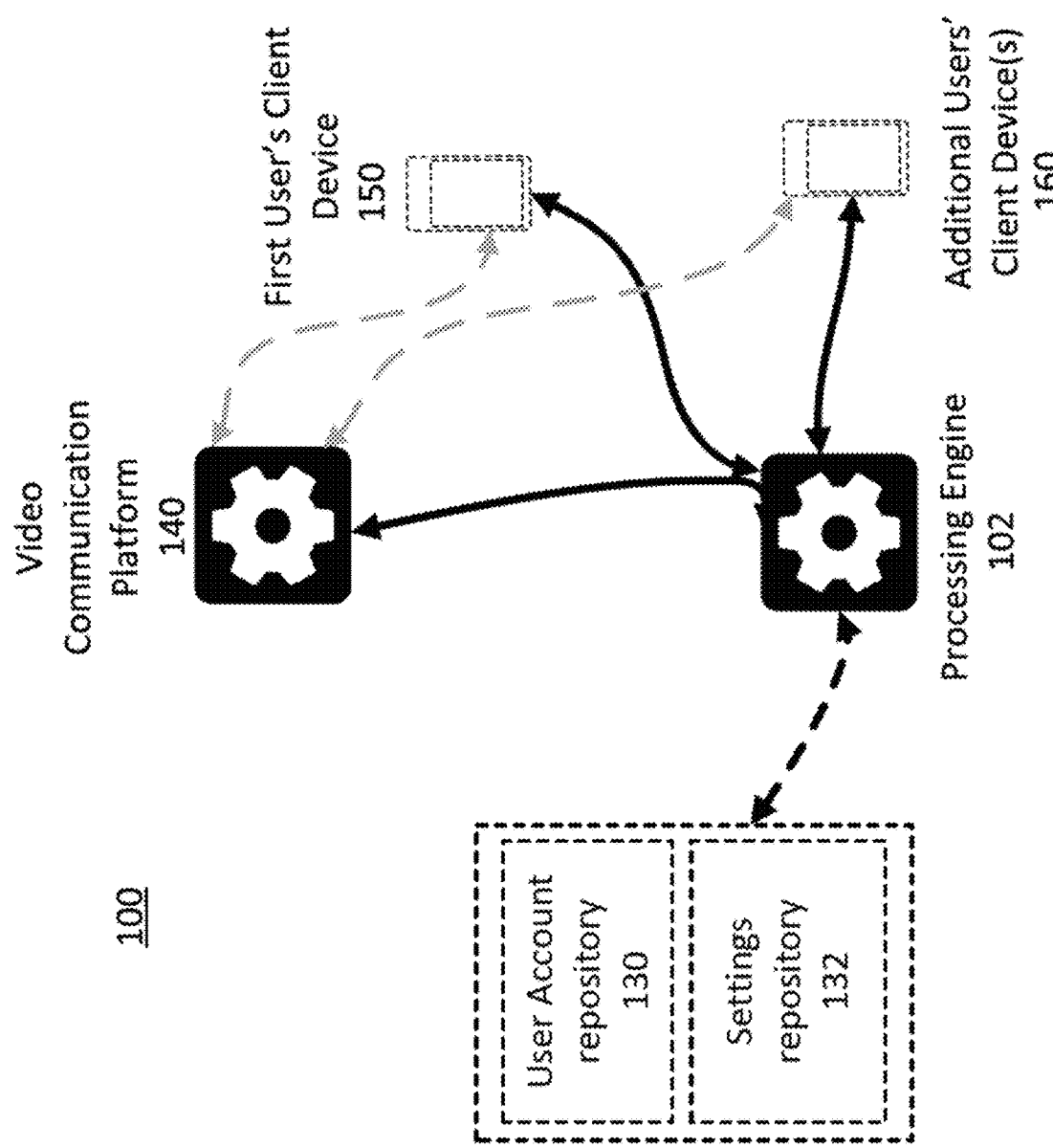
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130 and/or a settings repository 132. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 640, 1000, 1100, or other methods herein and, as a result, provide for dynamic camera views in a virtual environment. A virtual environment may comprise a VR environment or AR environment. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 160 may perform the methods 640, 1000, 1100, or other methods herein and, as a result, provide for dynamic camera views in a virtual environment. In some embodiments, this may be accomplished via communication with the first user's client device 150, additional users' client device(s) 160, processing engine 102, video communication platform 140, and/or other device(s) over a network between the device(s) and an application server or some other network server.

The first user's client device 150 and additional users' client device(s) 160 may be devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, webinar, or any other suitable video presentation) on a video communication platform. The additional users' client device(s) 160 may be configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, video phone, conferencing system, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130 and settings repository 132. The user account repository may store and/or maintain user account information associated with the video communication platform 140. In some embodiments, user account information may include sign-in information, user settings, subscription information, billing information, connections to other users, and other user account information. The settings repository 132 may store and/or maintain settings associated with the communication platform 140. In some embodiments, settings repository 132 may include virtual environment settings, virtual reality (VR) settings, augmented reality (AR) settings, audio settings, video settings, video processing settings, and so on. Settings may include enabling and disabling one or more features, selecting quality settings, selecting one or more options, and so on. Settings may be global or applied to a particular user account.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
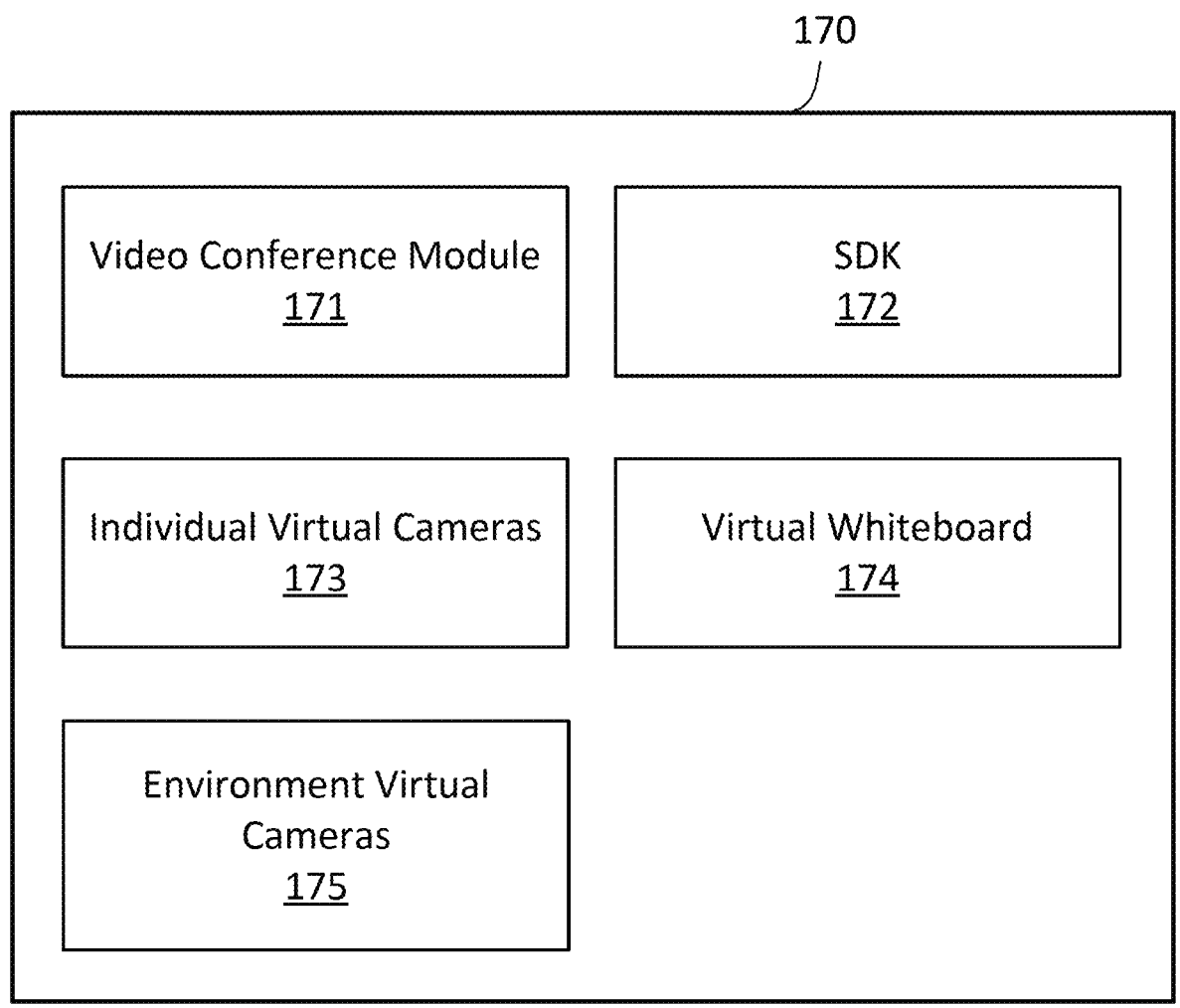
FIG. 1B is a diagram illustrating an exemplary computer system with software and/or hardware modules that may execute some of the functionality described herein.

FIG. 1B is a diagram illustrating an exemplary computer system 170 with software and/or hardware modules that may execute some of the functionality described herein. Computer system 170 may comprise, for example, a server or client device or a combination of server and client devices for dynamic camera views in a virtual environment.

Video conference module 171 provides system functionality for providing video conferences between one or more video conference participants. Video conference module 171 may comprise part or all of the video communication platform 140 and/or processing engine 102. Video conference module 171 may host a video conference session that enables one or more participants to communicate over video. In some embodiments, video conference module 171 may require users to authenticate themselves to join a video conference, such as by providing credentials like a username and/or password. In some embodiments, video conference module 171 may allow guest users to join a video conference without authenticating themselves and may notify participants in the meeting that one or more unauthenticated participants are present. A video conference session may include one or more video streams that each display one or more of the participants, or other scenes such as a screen-share or a virtual environment as described herein. In an embodiment, synchronized audio may be provided with the video streams.

Software development kit (SDK) 172 provides system functionality for enabling an application to interface with the video conference module 171. In some embodiments, SDK 172 may comprise an application programming interface (API). SDK 172 may be distributed to enable software developers to use functionality of the video conference module 171 in first party or $3^{rd}$ party software applications. In some embodiments, SDK 172 may enable first party or $3^{rd}$ party software applications to provide video communication such as video conferencing via the video communication platform 140 and processing engine 102. In some embodiments, SDK 172 may enable VR or AR applications to integrate video communication into a virtual environment.

Individual virtual cameras 173 provide system functionality for capturing video content in a virtual environment of an avatar of a user. One or more individual virtual cameras 173 may be used. In an embodiment, the avatar may comprise a digital representation of a user on a VR or AR device. In an embodiment, each of individual virtual cameras 173 may be focused on a single avatar. In an embodiment, one or more individual virtual cameras 173 may perform an auto frame function to automatically select configuration settings for the camera to select an appropriate view of the corresponding avatar. In an embodiment, the individual virtual cameras 173 may be used in a smart gallery mode of a video conference application.

Virtual whiteboard 174 provides system functionality for a virtual collaboration space. In some embodiments, virtual whiteboard 174 may allow functionality such as creating and editing objects, drawing, erasing, creating and deleting text or annotations, and so on. In an embodiment, one or more participants in a video conference session may share one or more virtual whiteboards 174 where they may collaborate and share information. In some embodiments, the contents of one or more virtual whiteboards 174 may be stored for retrieval at a later date. In some embodiments, contents of one or more virtual whiteboards 174 may be combined with other virtual whiteboards 174, such as by importing the content of virtual whiteboard into another virtual whiteboard.

Environment virtual cameras 175 provide system functionality for capturing video content in a virtual environment. One or more environment virtual cameras 175 may be used. In an embodiment, one or more environment virtual cameras 175 may be located in a virtual environment to capture video content of avatars of one or more users. In an embodiment, one or more environment virtual cameras 175 may have configurable settings such as location, facing direction, or other settings. In an embodiment, one or more environment virtual cameras 173 may perform an auto frame function to automatically select configuration settings for the camera to select an appropriate view of one or more avatars. In an embodiment, the one or more environment virtual cameras 173 may be used in a smart gallery mode of a video conference application.

Figure 2:
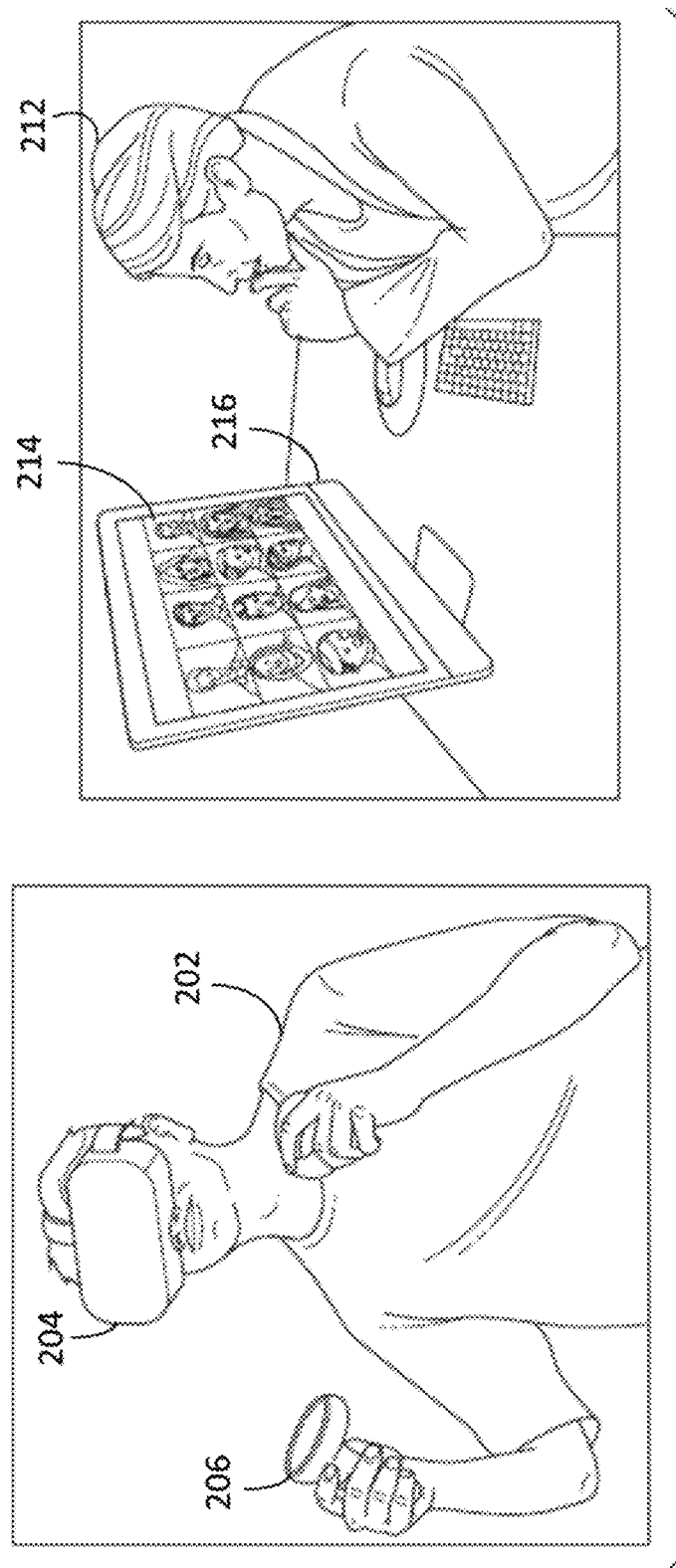
FIG. 2 illustrates one or more client devices that may be used to participate in a video conference and/or virtual environment.

FIG. 2 illustrates one or more client devices that may be used to participate in a video conference and/or virtual environment.

In an embodiment, a VR headset 204 may be worn by a VR user 202 to interact with a VR environment. The VR headset 204 may display 3D graphics to the VR user 202 to represent a VR environment, which may be generated by a VR application. Moreover, the VR headset 204 may track the movement of the VR user's head and/or other body parts to update its display to simulate an experience of being in the VR environment. In an embodiment, a VR headset 204 may optionally include controllers 206 to control the VR application. In some embodiments, the VR headset 204 may enable the VR user 202 to participate in a video conference within a VR environment.

Similarly, in an embodiment, an AR headset may be worn by an AR user to interact with an AR environment. The AR headset may display AR graphics, such as holograms, to the AR user to represent an AR environment, which may be generated by an AR application. The AR application may enable viewing a mixed reality environment that includes some AR objects and some real objects. Moreover, the AR headset may track the movement of the AR user's head or other body parts to update its display to simulate the AR environment. In an embodiment, an AR headset may optionally include controllers to control the AR application. In some embodiments, the AR headset may enable the AR user to participate in a video conference within an AR environment.

In an embodiment, a computer system 216 may provide a video conference application 214 that is communicably connected to video communication platform 140 and processing engine 102. The video conference application 214 may enable a video conference participant 212 to communicate with other participants on a video conference, including participants joining from video conference application 214 or VR headset 204 or an AR headset.

Figure 3:
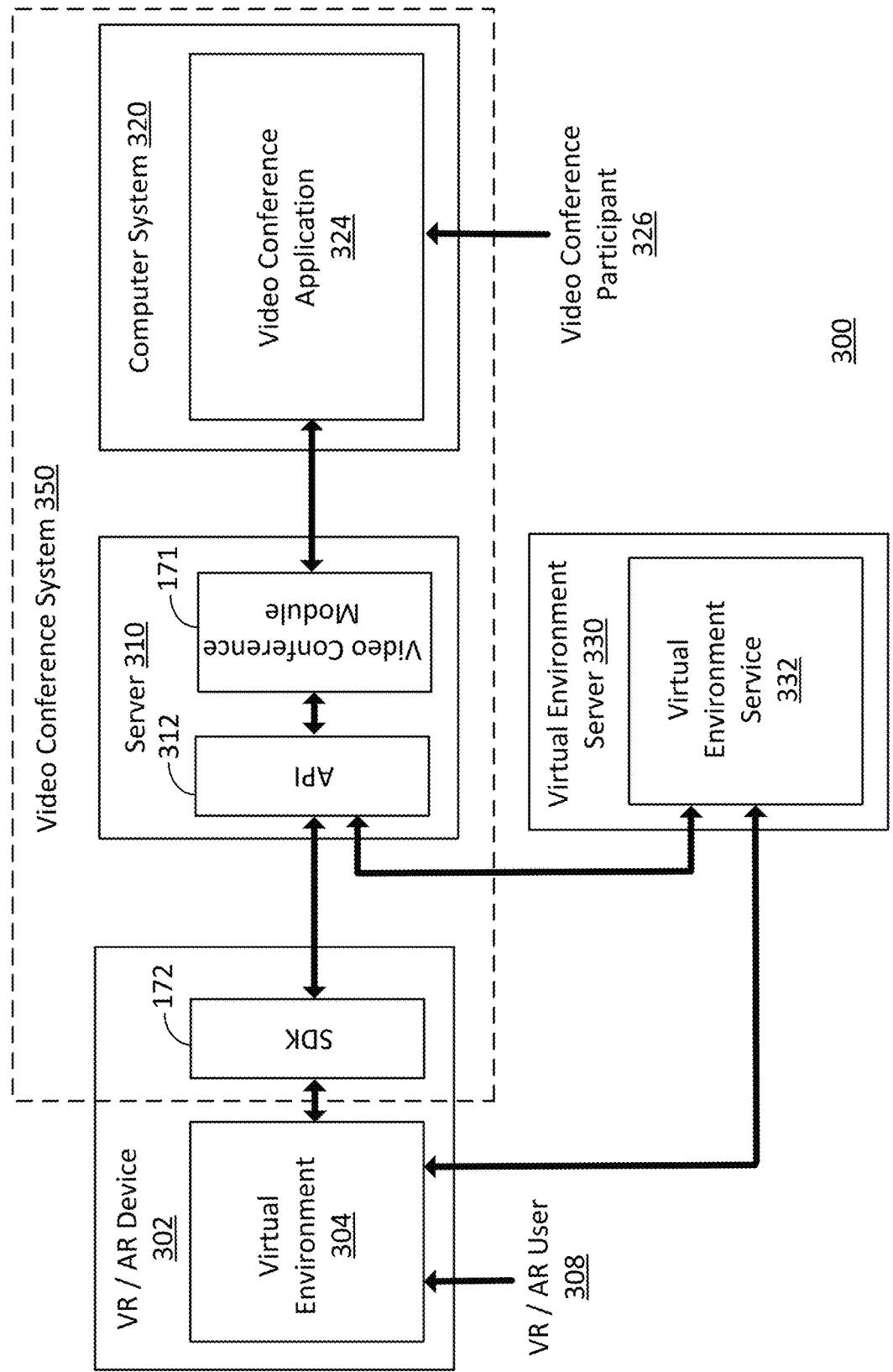
FIG. 3 is a diagram illustrating an exemplary environment in which some embodiments may operate.

FIG. 3 is a diagram illustrating an exemplary environment 300 in which some embodiments may operate. In an embodiment, computer system 320 provides a video conference application 324 that enables video conference participant 326 to join a video conference session. The video conference application 324 connects to server 310 hosting video conference module 171. The video conference module 171 may provide system functionality for hosting one or more video conference sessions and connecting one or more participants via video communication.

In an embodiment, a VR/AR device 302, which may comprise a VR or AR device such as a headset, displays a virtual environment 304, which may comprise a VR environment or AR environment. VR/AR user 308, which may comprise a VR or AR user, may interact with the virtual environment 304 using the VR/AR device 302. Virtual environment 304 may connect with SDK 172 on VR/AR device 302. SDK 172 enables the virtual environment 304, which may comprise a VR or AR application, to connect to API 312 on server 310. The API 312 may provide access to functionality of video conferencing module 171. Virtual environment 304 may be enabled to provide access to video conference sessions that may include other VR/AR users and video conference participant 326 through SDK 172, API 312, and video conference module 171.

In an embodiment, virtual environment 304 may connect to virtual environment service 332 on virtual environment server 330. In an embodiment, the virtual environment service 332 may host a backend of the virtual environment 304. The virtual environment service 332 may comprise data and functions for providing the virtual environment 304 to the VR/AR user 308. For example, virtual environment service 332 may store persistent objects and locations in the virtual environment 304 and maintain a consistent virtual world for experience by other VR/AR users who may also join the same virtual environment through their own VR/AR device. In an embodiment, the virtual environment service 332 may optionally connect to the API 312 to communicate data to and from the video conference module 171. For example, the virtual environment service 332 may transmit or receive global data about the virtual environment 304 with the video conference module 171. In an embodiment, the virtual environment server 330 may include a copy of SDK 172 for interfacing between virtual environment service 332 and API 312.

In an embodiment, the computer system 320, video conference application 324, server 310, video conference module 171, API 312, and SDK 172 may comprise aspects of a video conference system 350. In an embodiment, the virtual environment 304, virtual environment server 330, and virtual environment service 332 may comprise aspects of a $3^{rd}$ party VR or AR application. Alternatively, the virtual environment 304, virtual environment server 330, and virtual environment service 332 may comprise aspects of a first party VR/AR application that comprise further aspects of video conference system 350.

II. Exemplary Systems

Figure 4:
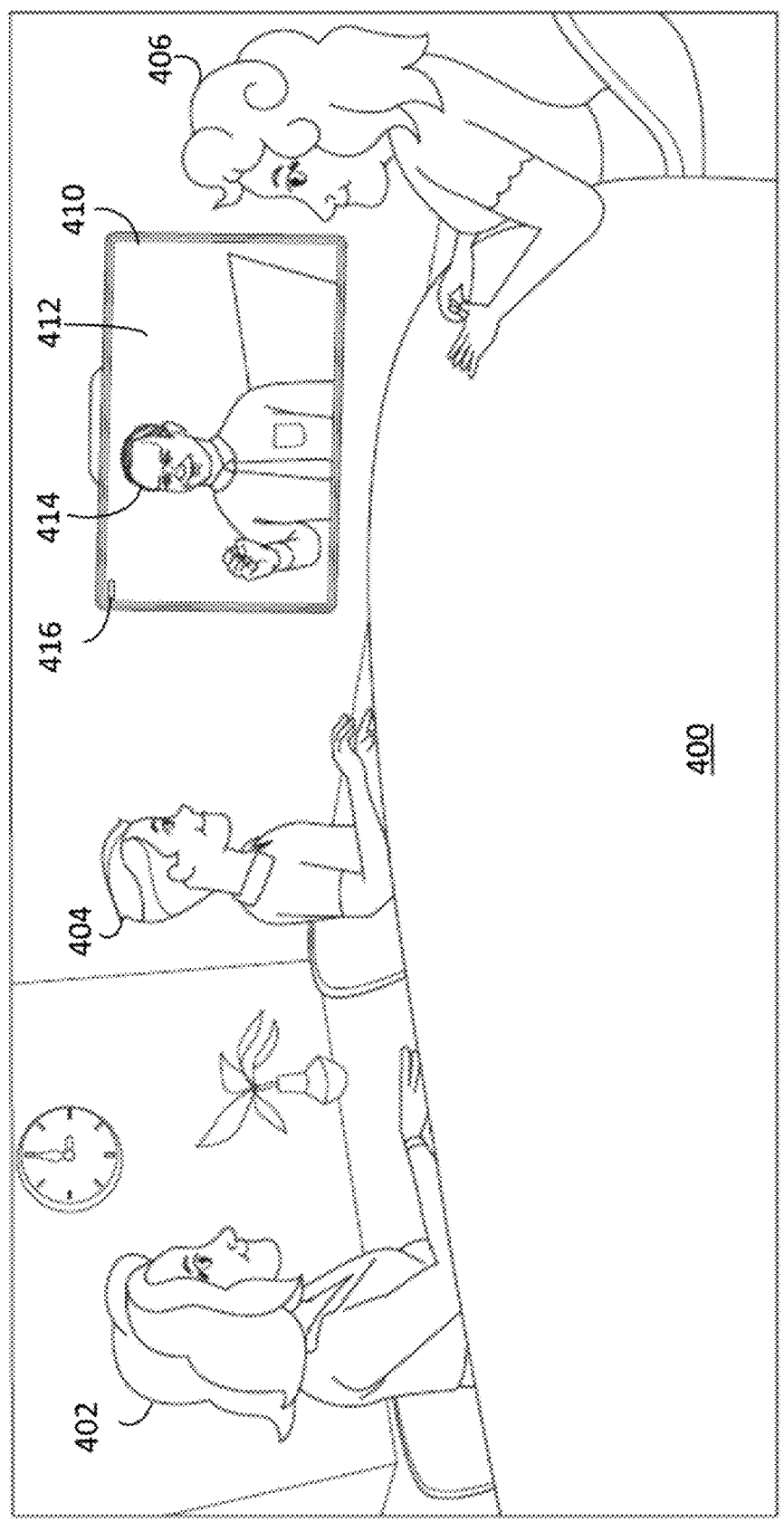
FIG. 4 illustrates an exemplary virtual environment according to one embodiment of the present disclosure.

FIG. 4 illustrates an exemplary virtual environment 400 according to one embodiment of the present disclosure. The virtual environment 400 may comprise a VR or AR environment such as a 3D world including digital representations, such as 3D avatars 402, 404, 406, of one or more users. Digital representations may also comprise 2D representations, such as images, videos, sprites, and so on. Each of the digital representations may represent a VR/AR user who is viewing and interacting with the virtual environment 400 from a VR/AR device. The virtual environment 400 may be displayed to each VR/AR user from the perspective of their digital representations. The virtual environment 400 is illustrated as an indoor conference room, but any other virtual environment may also be presented such as representations of outdoor areas, video game worlds, and so on.

Video conference view 410 in virtual environment 400 may display a video stream 412 including real-time video of video conference participant 414. The video may be captured from the camera of the computer system of the video conference participant 414. The VR or AR application may receive video stream 412 from video conference module 171 through SDK 172 and render the video stream 412 on the surface of a 3D object in the virtual environment 400, such as a 3D representation of a screen, projector, wall, or other object. In an embodiment, the video conferencing application may run in the virtual environment 400. VR or AR application may render a user interface 416 of the video conferencing application that may contain the video stream 412. The user interface 416 may also be rendered on the surface of a 3D object.

Figure 5:
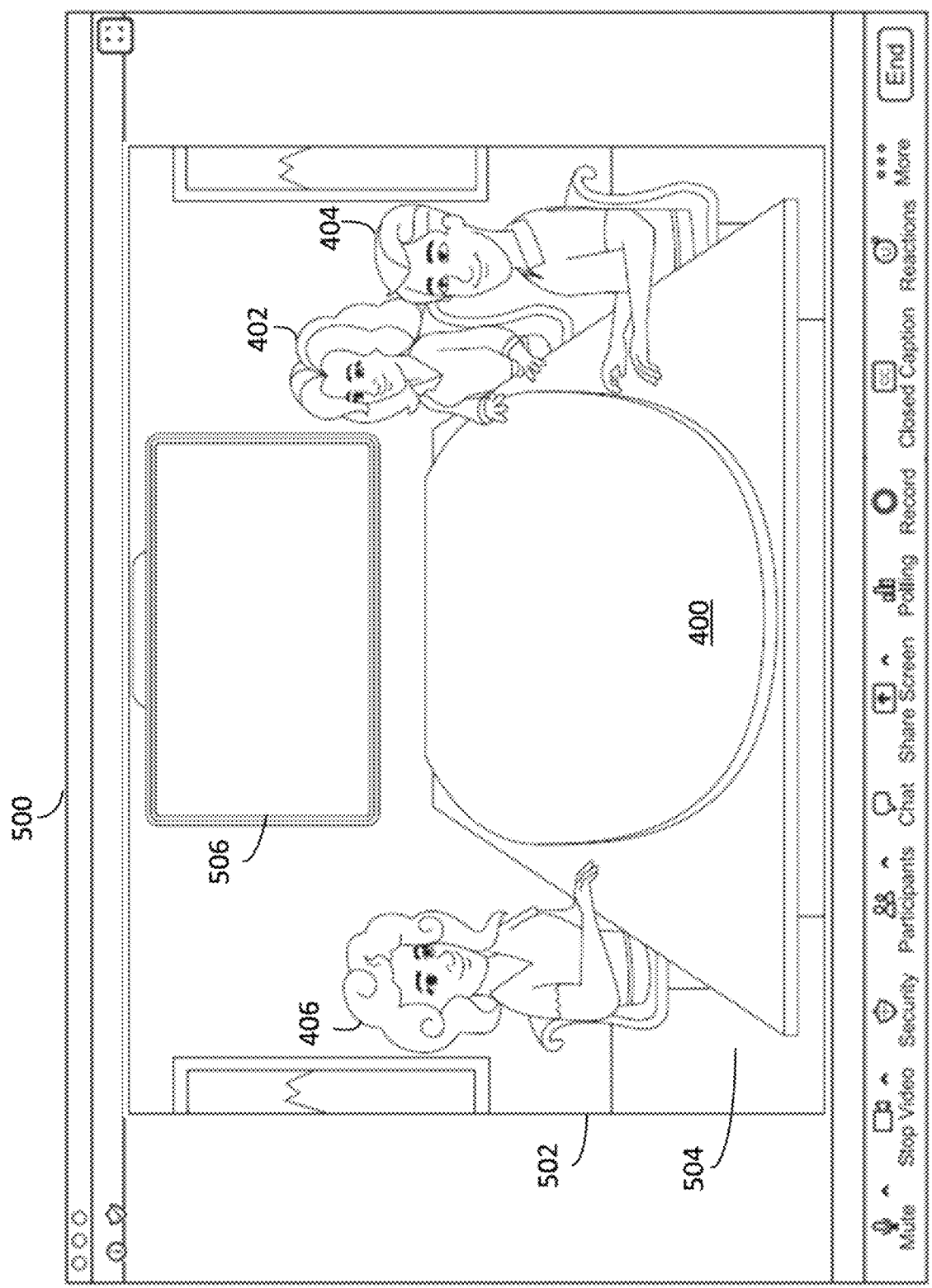
FIG. 5 illustrates an exemplary user interface according to one embodiment of the present disclosure.

FIG. 5 illustrates an exemplary user interface 500 according to one embodiment of the present disclosure. User interface 500 may comprise the interface of a video conferencing application. Content view 502 displays a view of the virtual environment 400, including the 3D avatars 402, 404, 406 of participants in the video conference. Virtual environment 400 may include a virtual whiteboard 506. The content view 502 may comprise video content 504, such as streaming video, captured from a virtual camera in the virtual environment 400. The video content 504 may display an environment view showing the virtual environment 400. In one embodiment, the video content 504 displays a single environment view, which includes one or more 3D avatars 402, 404, 406, in the content view 502. The video content may be encoded in streaming video format by an encoder on a VR/AR device 302 or a server 310. In some embodiments, the encoder may comprise SDK 172. In an embodiment, the video content may comprise 2D video formats such as MP4, MP3, AVI, FLV, WMV, and other formats. The video content may be transmitted from the VR/AR device 302 to the video conference module 171 of the server 310 and on to the computer system 320 and video conference application 324. User interface 500 may be displayed on a computer system to a video conference participant 326. In an embodiment, user interface 500 may be displayed on the surface of a 3D object to display the video conferencing application in a virtual environment 400, such as user interface 416. In an embodiment, user interface 500 may include one or more user interface controls for controlling the video conference, sharing the screen, recording, and so on.

Figure 6A:
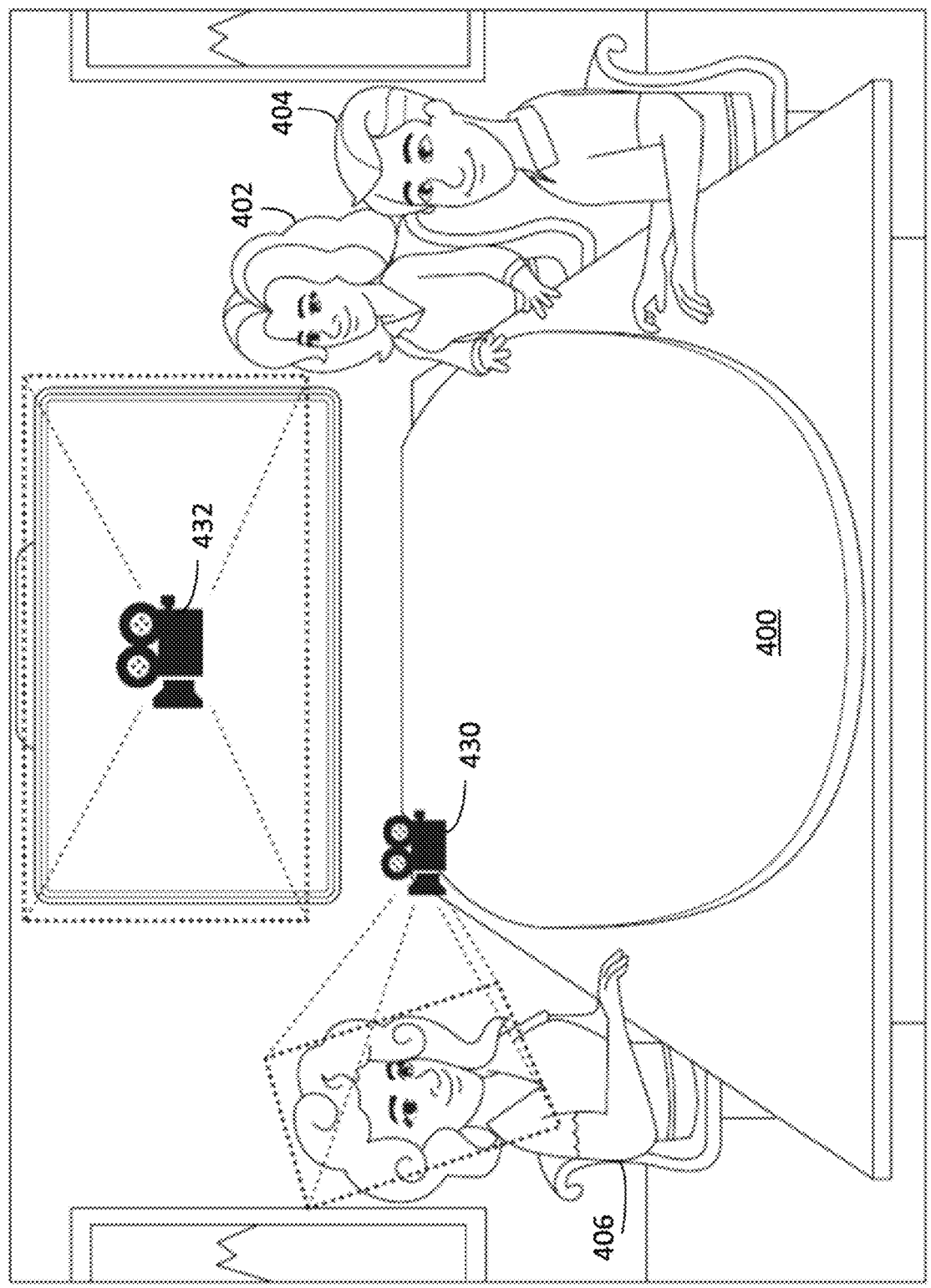
FIG. 6A illustrates an exemplary virtual environment according to one embodiment of the present disclosure.

FIG. 6A illustrates an exemplary virtual environment 400 according to one embodiment of the present disclosure. As described elsewhere herein, the virtual environment 400 may comprise a VR or AR environment such as a 3D world including digital representations, such as 3D avatars 402, 404, 406, of one or more users. In an embodiment, virtual environment 400 may include exemplary individual virtual camera 430 and exemplary environment virtual camera 432. One individual virtual camera and one environment virtual camera are illustrated, but more or fewer individual virtual cameras and environment virtual cameras may be in virtual environment 400.

In an embodiment, one or more individual virtual cameras and/or one or more environment virtual cameras may enable a smart gallery mode. Smart gallery mode may allow displaying video content of a plurality of avatars and/or environment views in a video conference application.

In an embodiment, each virtual camera, whether an individual virtual camera, environment virtual camera, or other virtual camera, may capture a view of the virtual environment 400 comprising a viewport. The viewport may comprise a view of a 3D environment that is captured from a position in the 3D environment. Each virtual camera may generate video content based on the portion of the 3D environment that is within the viewport for transmitting to a video conference application. In an embodiment, a virtual camera may have a location and facing direction in the virtual environment 400 and may have one or more configuration settings that may be selected such as aspect ratio, zoom, front and back clipping planes, frame rate, and so on. In an embodiment, a virtual camera may be moved to different positions in the virtual environment 400 and may be faced in different directions via rotations about any axis.

In an embodiment, a plurality of individual virtual cameras each capture a video stream of a 3D avatar. In an embodiment, individual virtual camera 430 is directed at 3D avatar 406. In an embodiment, individual virtual camera 430 may be focused on 3D avatar 406. In an embodiment, individual virtual camera 430 may be located in front of the 3D avatar 406 and have a facing direction to look toward 3D avatar 406. In an embodiment, individual virtual camera 430 may be aimed at 3D avatar 406 and other 3D avatars are not in the view of the camera. In an embodiment, individual virtual camera 430 may be locked to 3D avatar 406 so that the camera stays focused on the 3D avatar 406. In an embodiment, individual virtual camera 430 may follow the 3D avatar 406 when the avatar moves in the virtual environment 400. In an embodiment, individual virtual camera 430 has a fixed location in virtual environment 400 and rotates and/or zooms to follow the 3D avatar 406. In an embodiment, individual virtual camera 430 may freely move in virtual environment 400 to follow the 3D avatar 406, such as by moving to new locations. Similarly, individual virtual cameras may be associated with 3D avatars 402, 404 and have the functionality like that of individual virtual camera 430 described herein. In an embodiment, individual virtual cameras may have the ability to pan, tilt, zoom, and move in other ways. In an embodiment, individual virtual cameras may comprise one or more configuration settings that may be selected such as aspect ratio, zoom, front and back clipping planes, frame rate, and so on.

In an embodiment, one or more individual virtual cameras may perform an auto frame process to set its configuration settings automatically. In an embodiment, an exemplary individual virtual camera 430 may perform auto frame to automatically select configuration settings suitable for capturing video of the 3D avatar 406. In an embodiment, exemplary virtual camera 430 may perform auto frame to automatically select configuration settings, such as location, rotation, and/or zoom, for the camera for 3D avatar 406 to appear at a predefined size in the video captured by the camera. In an embodiment, exemplary virtual camera 430 may perform auto frame to automatically select configuration settings, such as location, rotation, and/or zoom, for the camera for the video captured of 3D avatar 406 to have margins of a predefined size between the 3D avatar 406 and one or more edges of the video.

In an embodiment, one or more environment virtual cameras may capture a video stream of the virtual environment 400. In an embodiment, the video stream captured may include or not include one or more 3D avatars. In an embodiment, environment virtual cameras may be located at any location and may have any facing direction in the virtual environment 400. In an embodiment, environment virtual cameras may have the ability to pan, tilt, zoom, and move in other ways. In an embodiment, environment virtual cameras may comprise one or more configuration settings that may be selected such as aspect ratio, zoom, front and back clipping planes, frame rate, and so on. In an embodiment, one or more environment virtual cameras may be created, placed in the virtual environment 400, moved, and/or deleted by video conference participant 326 or VR/AR user 308.

In an embodiment, an environment virtual camera may be located at the viewpoint of video stream 412 in the virtual environment 400 to enable the video conference participant to view the virtual environment 400 from the perspective of where the video stream 412 and video conference application are displayed in the virtual environment 400. In an embodiment, the environment virtual camera may have the same location and same facing direction as the location and facing direction of the video stream 412 in the virtual environment 400. In an embodiment, an environment virtual camera may provide an overview view of the virtual environment 400 by being placed above the virtual environment 400 and angled downwards towards the virtual environment 400. In an embodiment, an environment virtual camera may provide a top-down view or side view of the virtual environment 400.

In an embodiment, one or more environment cameras may move around the virtual environment 400. In an embodiment, one or more environment cameras may have a preset motion in the virtual environment 400, such as by a programmed script. In an embodiment, one or more environment cameras may have dynamic settings to follow an object, such as an avatar or other object, or beacon in the virtual environment 400. In an embodiment, one or more environment cameras may move to a new location or change their facing direction to face and capture video content of the avatar of a user who is currently speaking in the video conference session. In an embodiment, one or more environment cameras may move to a new location or change their facing direction to face and capture video content of the avatars of the users who spoke most recently in the video conference session. For example, in an embodiment, one or more environment cameras may move or turn to face the avatars of the last two, three, four, five, six, or more users who spoke in the video conference session.

In an embodiment, one or more environment virtual cameras may perform an auto frame process to set its configuration settings automatically. In an embodiment, an environment virtual camera may perform auto frame to automatically select configuration settings suitable for capturing video of a predefined view of the virtual environment 400. In an embodiment, an environment virtual camera may perform auto frame to automatically select configuration settings, such as location, rotation, and/or zoom, for the camera for one or more 3D avatars 402, 404, 406 to appear at a predefined size in the video captured by the camera. In an embodiment, an environment virtual camera may perform auto frame to automatically select configuration settings, such as location, rotation, and/or zoom, for the camera for the video captured of one or more 3D avatars 402, 404, 406 to have margins of a predefined size between the 3D avatars and one or more edges of the video. In an embodiment, an environment virtual camera may perform auto frame to automatically select configuration settings, such as location, rotation, and/or zoom, for the camera to capture all of the 3D avatars in a virtual environment 400 in the view.

In one embodiment, the virtual environment 400 may include an individual virtual camera for each 3D avatar 402, 404, 406 in the virtual environment 400, which each capture video of the corresponding 3D avatar, and one environment virtual camera for capturing a view of all of the 3D avatars 402, 404, 406 in the environment in a single view.

In some embodiments, the virtual environment 400 may comprise different types of environments such as representations of a single room, multiple rooms, open area, or other types of areas. In an embodiment, the virtual environment 400 may comprise representations of a conference room, an office, a classroom, a lecture hall, a park, a beach, and other areas. In one embodiment, all of the 3D avatars may appear in the same room, such as a conference room, or may be in multiple rooms of the virtual environment 400.

Figure 6B:
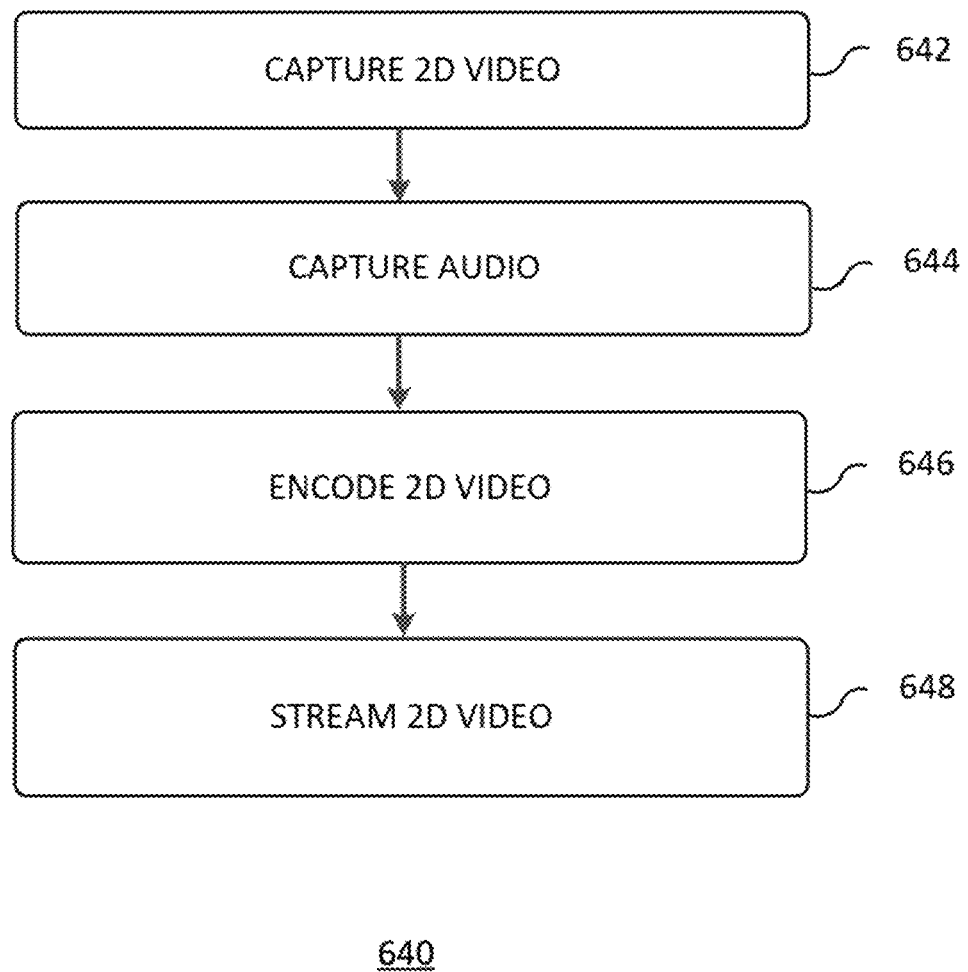
FIG. 6B illustrates an exemplary method that may be performed in some embodiments.

FIG. 6B illustrates an exemplary method 640 that may be performed in some embodiments. Video content may be captured from the virtual environment 400 in many different ways, and method 640 comprises one exemplary method for doing so. At step 642, a video conference application or VR/AR application captures 2D video of a 3D virtual environment. In an embodiment, the 2D video may be captured from the viewport of one or more virtual cameras. At step 644, the video conference application or VR/AR application may capture audio output from the virtual environment and/or from the microphone input of the VR/AR device. At step 646, the video conference application or VR/AR application may encode the 2D video. In some embodiments, the 2D video may be encoded into a streaming video format and may include the audio output. The encoding may be compressed or uncompressed. At step 648, the video conference application may stream the 2D video to a video conference module and one or more client devices.

Figure 7:
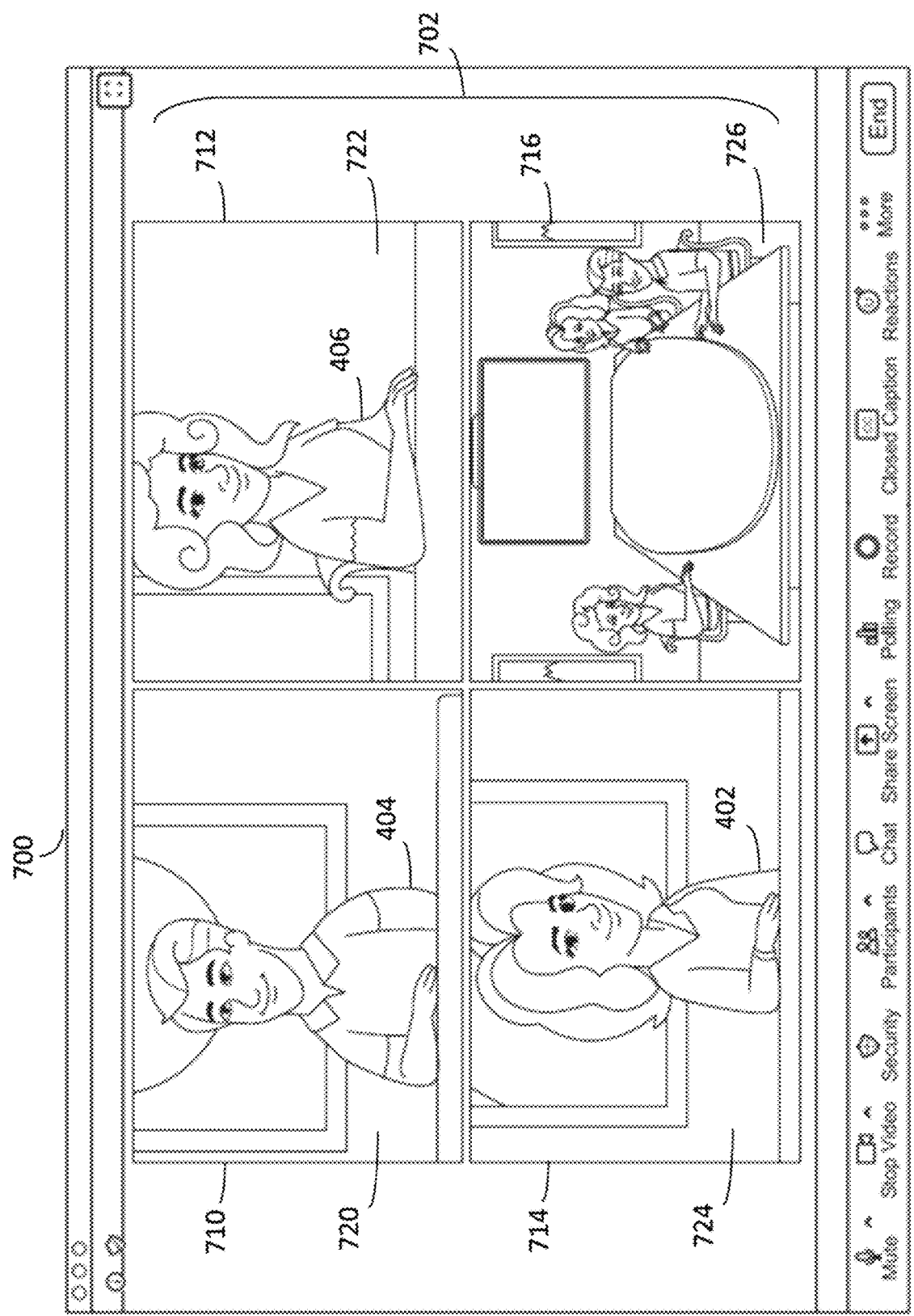
FIG. 7 illustrates an exemplary user interface according to one embodiment of the present disclosure.

FIG. 7 illustrates an exemplary user interface 700 according to one embodiment of the present disclosure. User interface 700 may comprise the interface of a video conferencing application. User interface 700 may display a smart gallery view 702. In an embodiment, smart gallery view 702 may comprise content views 710, 712, 714, 716 that display streaming videos 720, 722, 724, 726, which are captured by individual virtual cameras or environment virtual cameras in the virtual environment 400.

In an embodiment, smart gallery view 702 includes a plurality of streaming videos showing different views of the virtual environment 400. In an embodiment, the smart gallery view 702 may display video content from some or all of the individual virtual cameras and/or some or all of the environment virtual cameras in the virtual environment 400. Smart gallery view 702 is illustrated with streaming video 720 captured from an individual virtual camera of 3D avatar 404, streaming video 722 captured from an individual virtual camera of 3D avatar 406, streaming video 724 captured from an individual virtual camera of 3D avatar 402, and streaming video 726 captured from an environment virtual camera. In one embodiment, each 3D avatar is displayed in its own individual camera view, and an environment view displays each 3D avatar together in the same view.

In an embodiment, the smart gallery view 702 may comprise a gallery view displaying a plurality of content views, each comprising a streaming video, in rectangles on a display. The gallery view may display a plurality of streaming videos in real time simultaneously. In an embodiment, a gallery view may comprise a grid of rectangular content views with streaming video. In an embodiment, the smart gallery view 702 may comprise one or more quadrants, and one or more of the quadrants may comprise a content view with a streaming video. In an embodiment, one or more quadrants may be subdivided into a plurality of content views each comprising a streaming video. For example, one or more quadrants may be divided in halves, thirds, quadrants, and so on. In an embodiment, the smart gallery view 702 may comprise one or more boxes, and one or more of the boxes may comprise a content view with a streaming video. In an embodiment, one or more boxes may be subdivided into a plurality of content views each comprising a streaming video. For example, one or more boxes may be divided in halves, thirds, quadrants, and so on. In an embodiment, the smart gallery view 702 may be divided into vertical slices by dividing the view on the horizontal axis. Each vertical slice may occupy the full height of the parent view and a portion of the width of the parent view. Each vertical slice may comprise a content view with a streaming video. In an embodiment, the smart gallery view 702 may be divided into horizontal slices by dividing the view on the vertical axis. Each horizontal slice may occupy the full width of the parent view and a portion of the height of the parent view. Each horizontal slice may comprise a content view with a streaming video.

In an embodiment, 3D avatars 402, 404, 406 may display facial expressions on the face of the avatars. In an embodiment, the facial expressions may comprise 2D graphics or may comprise 3D graphics. In an embodiment, the facial expressions may be animated. Individual camera views may allow users to get a closer view of the facial expressions as compared to just an environment view. In an embodiment, the facial expressions may be controlled by user interface controls, sensors, face detection, face tracking, automated lip synching to speech audio, or other methods. In an embodiment, the facial expressions are determined using artificial intelligence or machine learning, such as by analyzing video of a user to determine the facial expression of the user to display on the corresponding avatar. In an embodiment, facial expressions may be controlled by a VR/AR user.

In an embodiment, 3D avatars 402, 404, 406 may comprise one or more 3D body parts that may move, such as the head, arms, hands, legs, body, and so on. In an embodiment, body parts of the 3D avatars 402, 404, 406 may move based on user interface controls, sensors, face detection, face tracking, person detection, body pose detection and estimation, or other methods. In an embodiment, the body part movements are determined using artificial intelligence or machine learning, such as by analyzing video of a user to determine the movements of the user. These body movements of the 3D avatars may be displayed in the individual camera views and/or environment camera views. In an embodiment, body movements may be controlled by a VR/AR user.

In an embodiment, use of smart gallery mode is optional. In an embodiment, the smart gallery mode may be a selectable option for a video conference participant. In an embodiment, one or more other view modes may be selected by the video conference participant such as an environment view of user interface 500.

Figure 8:
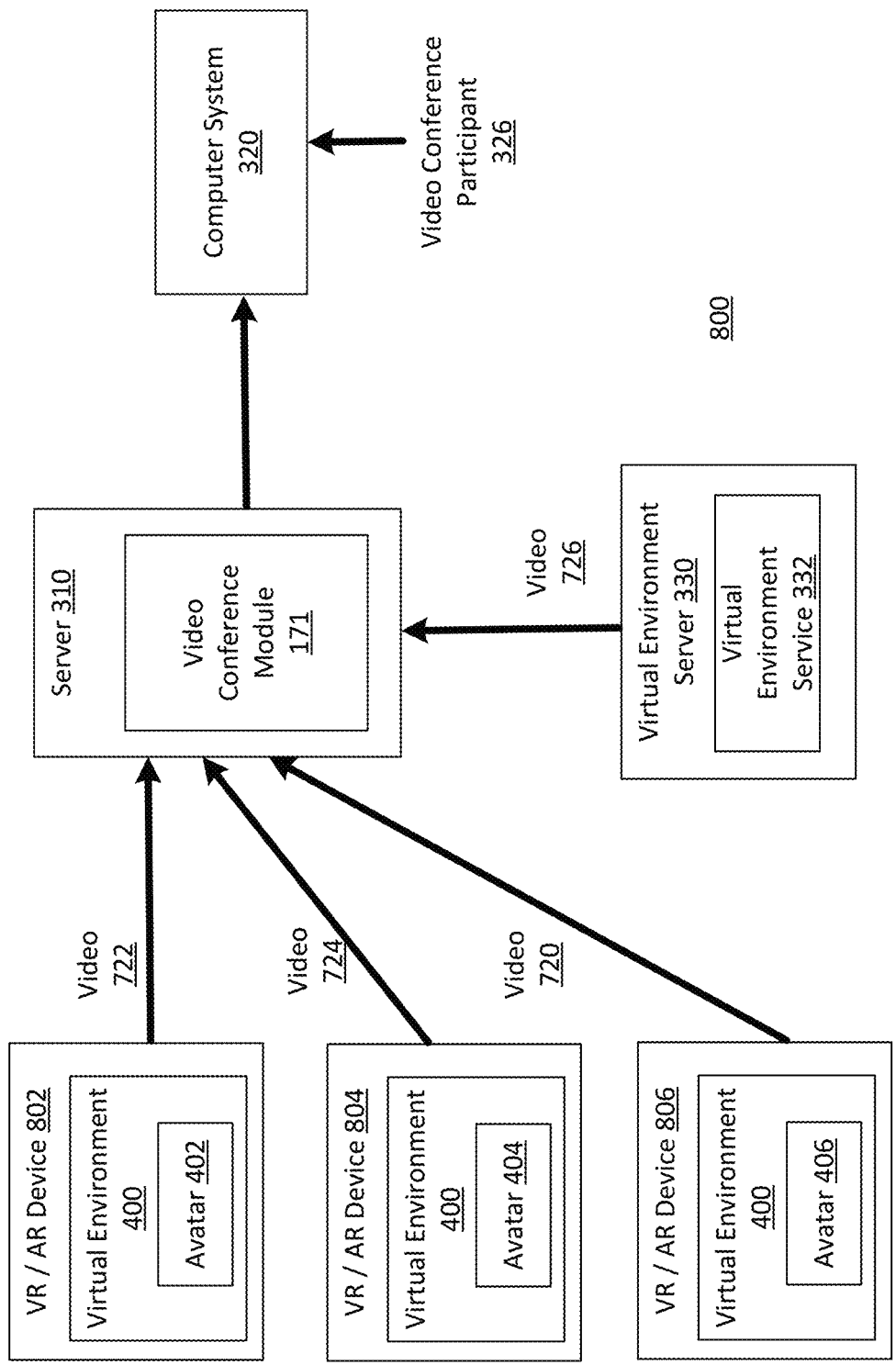
FIG. 8 is a diagram illustrating video streaming in an exemplary environment in which some embodiments may operate

FIG. 8 is a diagram illustrating video streaming in an exemplary environment 800 in which some embodiments may operate. In an embodiment, individual virtual camera views are captured on the VR/AR devices and transmitted to the video conference session, and environment virtual camera views are captured on the virtual environment server 330 and transmitted to the video conference session.

In an embodiment, an individual virtual camera is located in the local version of the virtual environment 400 on each VR/AR device for capturing the 3D avatar of the VR/AR user of the device. In an embodiment, the individual virtual camera in the virtual environment 400 on VR/AR device 802 captures streaming video 722 of avatar 402 and transmits the streaming video 722 to server 310 hosting the video conference module 171. In an embodiment, individual virtual cameras in the virtual environment 400 on VR/AR devices 804, 806 capture streaming video 724, 720 of avatars 404, 406, respectively, and transmit the streaming video 724, 720 to server 310. The streaming video from each VR/AR device may be transmitted to the computer system 320 to be displayed in individual camera views in a smart gallery view. In an embodiment, streaming video may be captured from the individual virtual cameras using SDK 172.

In an embodiment, one or more environment virtual cameras are located on the virtual environment server 330, such as in the virtual environment service 332. The virtual environment service may render the virtual environment 400 and capture streaming video 726 from one or more environment virtual cameras in the virtual environment 400. The streaming video from virtual environment server 330 may be transmitted to the computer system 320 to be displayed in an environment camera view in a smart gallery view. In an embodiment, streaming video may be captured from the environment virtual camera using SDK 172.

Figure 9:
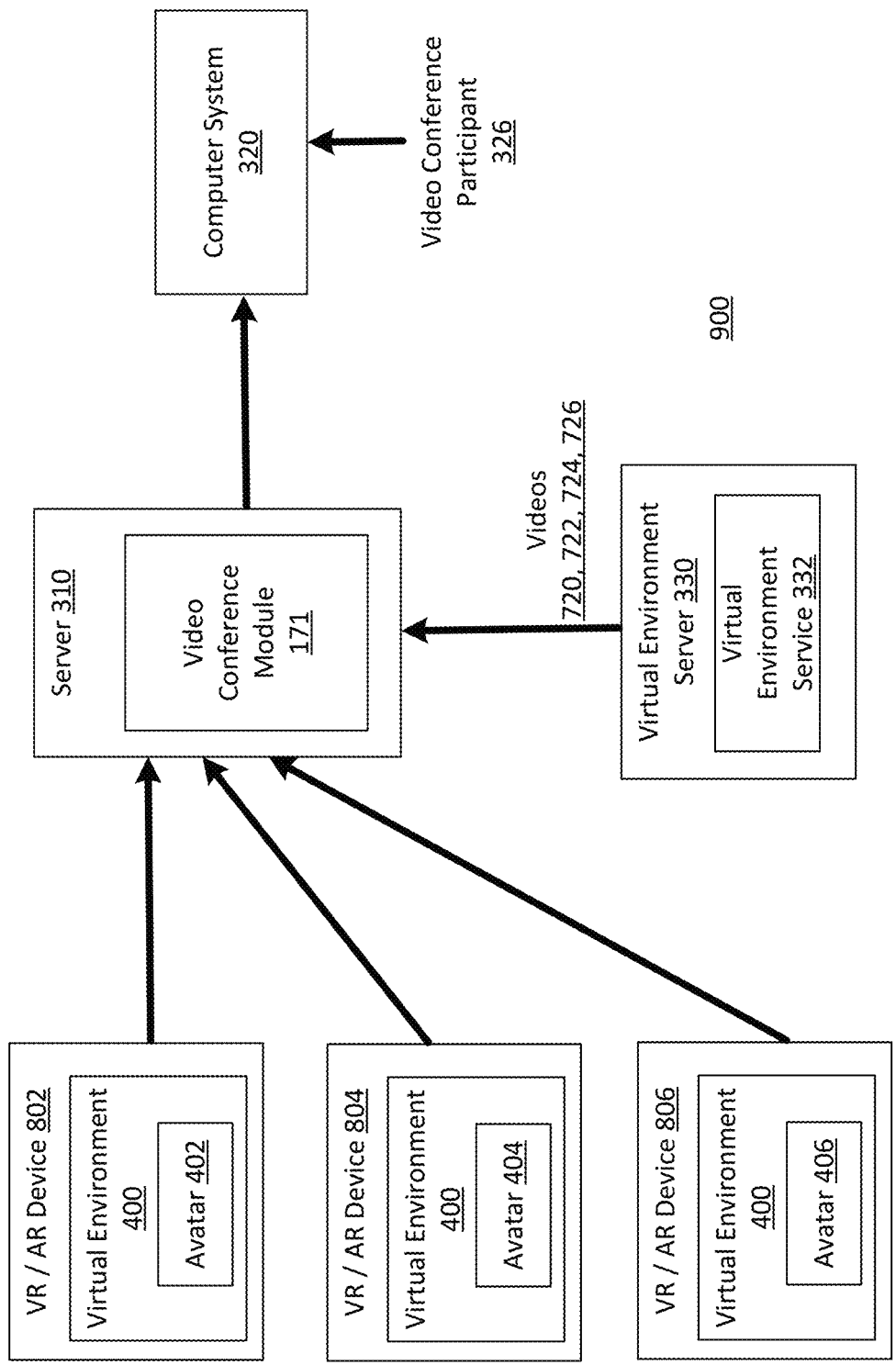
FIG. 9 is a diagram illustrating video streaming in an exemplary environment in which some embodiments may operate.

FIG. 9 is a diagram illustrating video streaming in an exemplary environment 900 in which some embodiments may operate. In an embodiment, individual virtual camera views and environment virtual camera views are captured on the virtual environment server 330 and transmitted to the video conference session.

In an embodiment, one or more individual virtual camera views and one or more environment virtual camera views are located on the virtual environment server 330, such as in the virtual environment service 332. The virtual environment service may render the virtual environment 400 and capture streaming video 720, 722, 724, 726 from the one or more individual virtual cameras and one or more environment virtual cameras in the virtual environment 400. The streaming video from virtual environment server 330 may be transmitted to the computer system 320 to be displayed in a smart gallery view. In an embodiment, streaming video may be captured from the virtual cameras using SDK 172.

III. Exemplary Methods

Figure 10:
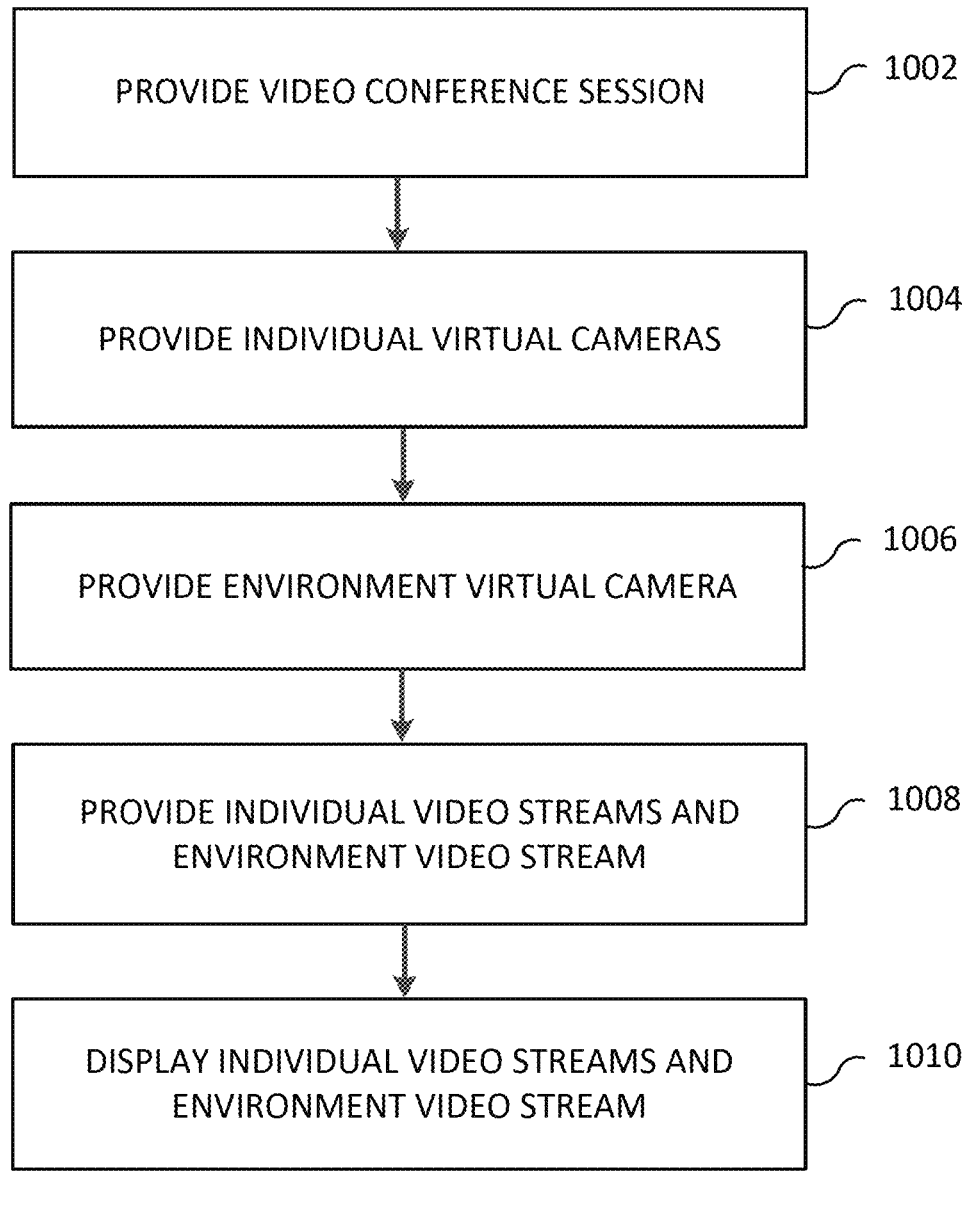
FIG. 10 illustrates an exemplary method that may be performed in some embodiments.

FIG. 10 illustrates an exemplary method 1000 that may be performed in some embodiments.

At step 1002, a video conference session is provided in a virtual environment including 3D avatars of one or more users. In an embodiment, the video conference session is hosted on a server and may connect a plurality of video conference participants. In an embodiment, the video conference session may connect one or more VR/AR users in the virtual environment and one or more video conference participants joining from one or more computer systems.

At step 1004, a plurality of individual virtual cameras are provided in the virtual environment, each individual virtual camera capturing an individual video stream of one of the 3D avatars. In an embodiment, each individual virtual camera is directed at the corresponding 3D avatar. In an embodiment, each individual virtual camera is locked on the corresponding 3D avatar to stay focused on the avatar.

At step 1006, an environment virtual camera is provided in the virtual environment, the environment virtual camera capturing an environment video stream that includes a plurality of the 3D avatars. In an embodiment, a video stream of a video conference participant is provided in the virtual environment, and the environment virtual camera is located in the virtual environment at the location of a display of the video stream of the video conference participant.

At step 1008, the plurality of individual video streams and the environment video stream are provided in the video conference session. In an embodiment, individual video streams and the environment video stream may be encoded and streamed to one or more video conference participants.

At step 1010, the plurality of individual video streams and the environment video stream are displayed in a video conference application. In an embodiment, the individual video streams and the environment video stream may be displayed in a smart gallery mode. In an embodiment, the individual video streams and the environment video stream may be displayed in a grid.

Figure 11:
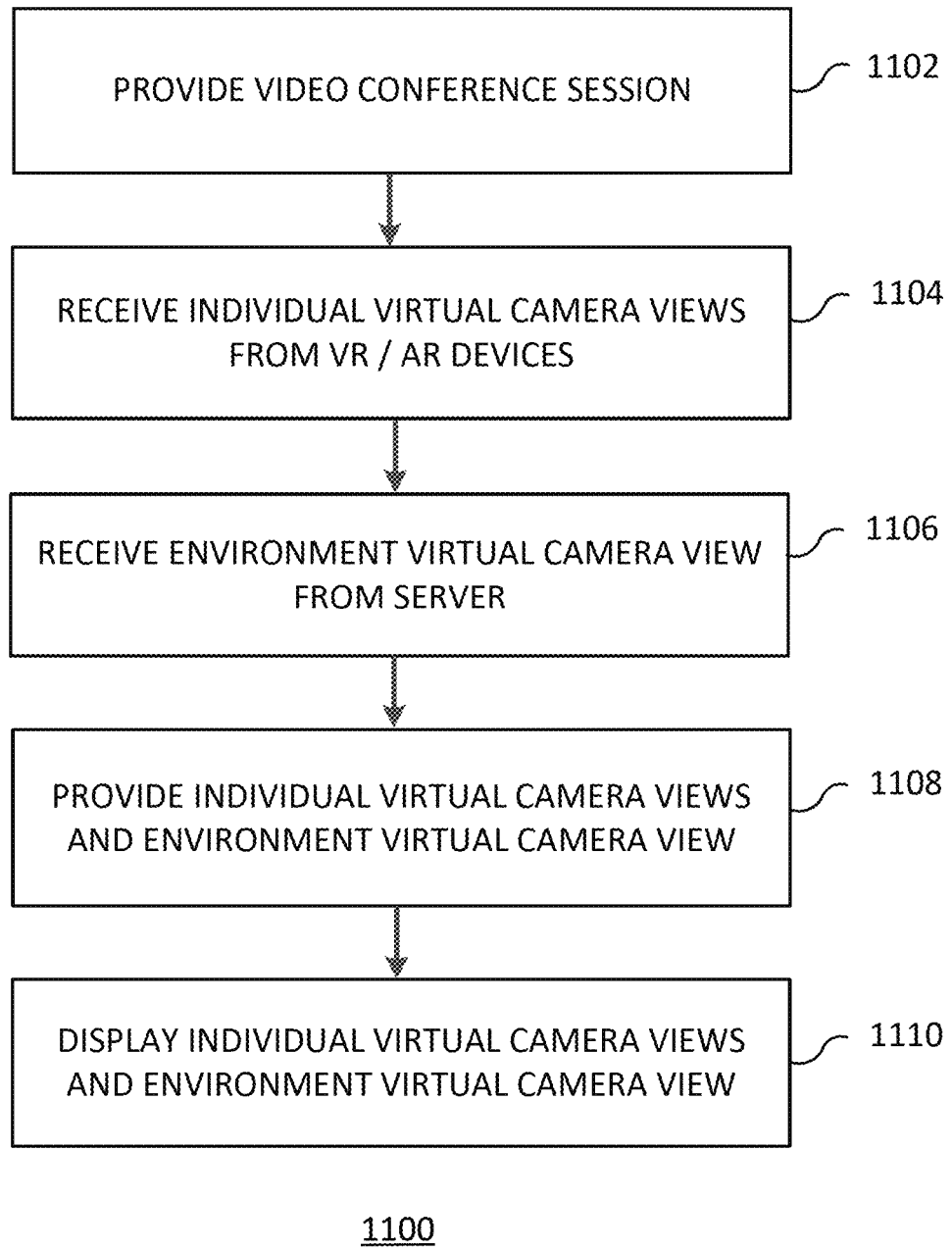
FIG. 11 illustrates an exemplary method that may be performed in some embodiments.

FIG. 11 illustrates an exemplary method 1100 that may be performed in some embodiments.

At step 1102, a video conference session is provided in a virtual environment including 3D avatars of one or more users. In an embodiment, the video conference session is hosted on a server and may connect a plurality of video conference participants. In an embodiment, the video conference session may connect one or more VR/AR users in the virtual environment and one or more video conference participants joining from one or more computer systems.

At step 1104, a plurality of individual virtual camera views of the 3D avatars are received from a plurality of VR or AR devices. In an embodiment, the each individual virtual camera view is captured by an individual virtual camera directed at the corresponding 3D avatar. In an embodiment, each individual virtual camera view comprises streaming video.

At step 1106, an environment virtual camera view is received from a server hosting a backend of the virtual environment. In an embodiment, the environment virtual camera view is captured by an environment virtual camera. In an embodiment, the environment virtual camera view comprises streaming video.

At step 1108, the plurality of individual virtual camera views and the environment virtual camera view are provided in the video conference session. In an embodiment, the individual virtual camera views and the environment virtual camera view may be encoded and streamed to one or more video conference participants.

At step 1110, the plurality of individual virtual camera views and the environment virtual camera view are displayed in a video conference application. In an embodiment, the individual video streams and the environment video stream may be displayed in a smart gallery mode. In an embodiment, the individual video streams and the environment video stream may be displayed in a grid.

Exemplary Computer System

Figure 12:
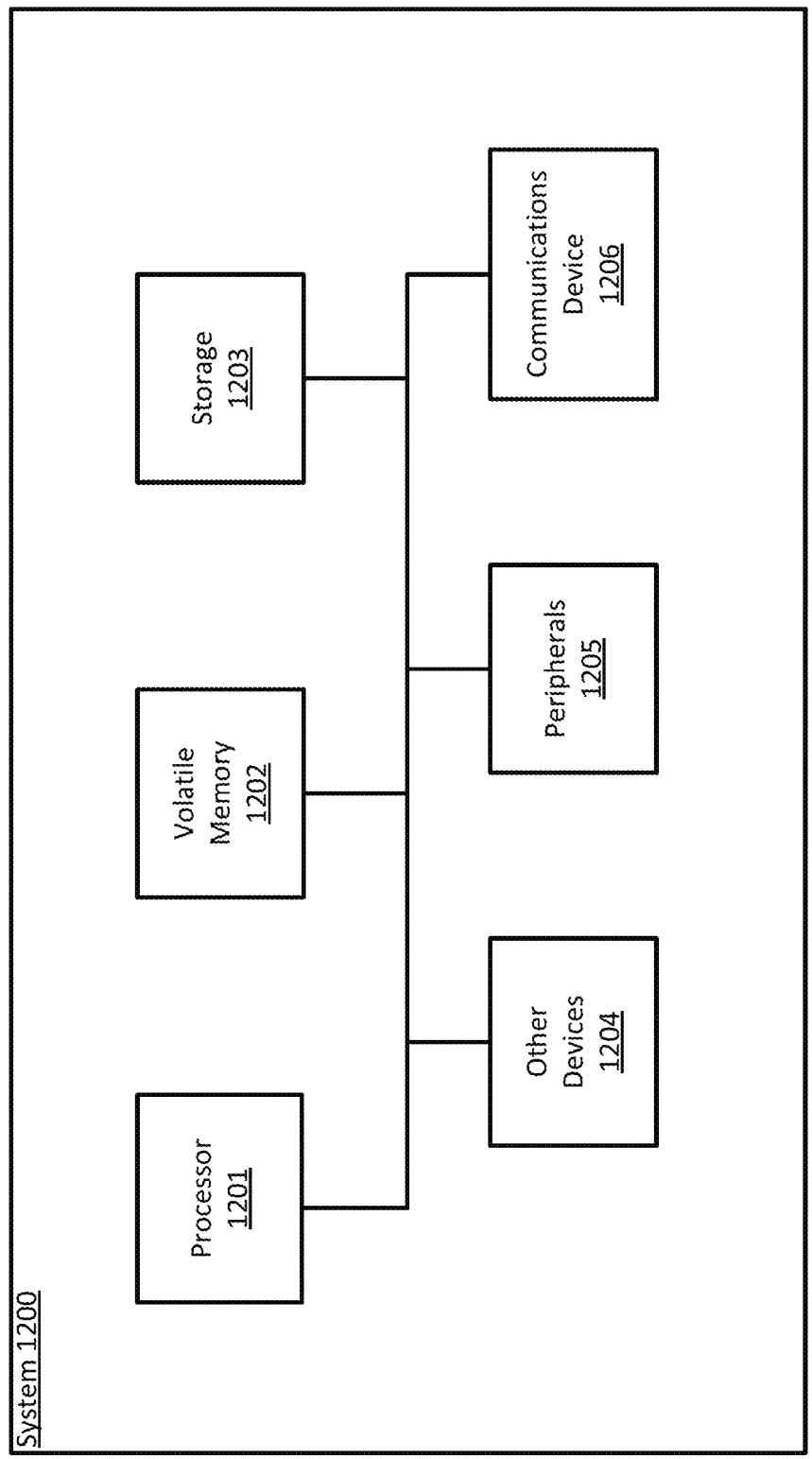
FIG. 12 is a diagram illustrating an exemplary computer that may perform processing in some embodiments.

FIG. 12 is a diagram illustrating an exemplary computer that may perform processing in some embodiments. Exemplary computer 1200 may perform operations consistent with some embodiments. The architecture of computer 1200 is exemplary. Computers can be implemented in a variety of other ways. A wide variety of computers can be used in accordance with the embodiments herein.

Processor 1201 may perform computing functions such as running computer programs. The volatile memory 1202 may provide temporary storage of data for the processor 1201. RAM is one kind of volatile memory. Volatile memory typically requires power to maintain its stored information. Storage 1203 provides computer storage for data, instructions, and/or arbitrary information. Non-volatile memory, which can preserve data even when not powered and including disks and flash memory, is an example of storage. Storage 1203 may be organized as a file system, database, or in other ways. Data, instructions, and information may be loaded from storage 1203 into volatile memory 1202 for processing by the processor 1201.

The computer 1200 may include peripherals 1205. Peripherals 1205 may include input peripherals such as a keyboard, mouse, trackball, video camera, microphone, and other input devices. Peripherals 1205 may also include output devices such as a display. Peripherals 1205 may include removable media devices such as CD-R and DVD-R recorders/players. Communications device 1206 may connect the computer 1200 to an external medium. For example, communications device 1206 may take the form of a network adapter that provides communications to a network. A computer 1200 may also include a variety of other devices 1204. The various components of the computer 1200 may be connected by a connection medium such as a bus, crossbar, or network.

It will be appreciated that the present disclosure may include any one and up to all of the following examples.

Example 1: A method comprising: providing a video conference session in a virtual environment including 3D avatars of one or more users; providing a plurality of individual virtual cameras in the virtual environment, each individual virtual camera capturing an individual video stream of one of the 3D avatars; providing an environment virtual camera in the virtual environment, the environment virtual camera capturing an environment video stream that includes a plurality of the 3D avatars; providing the plurality of individual video streams and the environment video stream in the video conference session; providing for display the plurality of individual video streams and the environment video stream in a video conference application.

Example 2: The method of Example 1, wherein the virtual environment comprises a VR environment.

Example 3: The method of any of Examples 1-2, wherein the virtual environment comprises an AR environment comprising one or more AR holograms.

Example 4: The method of any of Examples 1-3, wherein each individual virtual camera is locked to the corresponding 3D avatar.

Example 5: The method of any of Examples 1-4, further comprising: providing in the virtual environment a video stream of a video conference participant.

Example 6: The method of any of Examples 1-5, wherein the environment virtual camera is located in the virtual environment at the location of a display of a video stream of a video conference participant.

Example 7: The method of any of Examples 1-6, wherein the individual video streams are captured on one or more AR or VR devices and the environment video stream is captured on a server hosting a backend of the virtual environment.

Example 8: The method of any of Examples 1-7, wherein the individual video streams and the environment video stream are captured on a server hosting a backend of the virtual environment.

Example 9: The method of any of Examples 1-8, wherein the locations of the individual virtual cameras in the virtual environment are configurable.

Example 10: The method of any of Examples 1-9, wherein the location of the environment virtual camera in the virtual environment is configurable.

Example 11: The method of any of Examples 1-10, further comprising: performing an auto frame process, by the individual virtual cameras, to automatically select one or more configuration settings.

Example 12: The method of any of Examples 1-11, further comprising: performing an auto frame process, by the environment virtual cameras, to automatically select one or more configuration settings.

Example 13: The method of any of Examples 1-12, wherein the virtual environment includes a 3D room and the 3D avatars are in the 3D room.

Example 14: The method of any of Examples 1-13, wherein the video conference session and virtual environment communicate via an SDK.

Example 15: The method of any of Examples 1-14, wherein the individual video streams are provided through an API.

Example 16: A non-transitory computer readable medium that stores executable program instructions that when executed by one or more computing devices configure the one or more computing devices to perform operations comprising: providing a video conference session in a virtual environment including 3D avatars of one or more users; providing a plurality of individual virtual cameras in the virtual environment, each individual virtual camera capturing an individual video stream of one of the 3D avatars; providing an environment virtual camera in the virtual environment, the environment virtual camera capturing an environment video stream that includes a plurality of the 3D avatars; providing the plurality of individual video streams and the environment video stream in the video conference session; providing for display the plurality of individual video streams and the environment video stream in a video conference application.

Example 17: The non-transitory computer readable medium of Example 16, wherein the virtual environment comprises a VR environment.

Example 18: The non-transitory computer readable medium of any of Examples 16-17, wherein the virtual environment comprises an AR environment comprising one or more AR holograms.

Example 19: The non-transitory computer readable medium of any of Examples 16-18, wherein each individual virtual camera is locked to the corresponding 3D avatar.

Example 20: The non-transitory computer readable medium of any of Examples 16-19, wherein the executable program instructions further configure the one or more computing devices to perform operations comprising: providing in the virtual environment a video stream of a video conference participant.

Example 21: The non-transitory computer readable medium of any of Examples 16-20, wherein the environment virtual camera is located in the virtual environment at the location of a display of a video stream of a video conference participant.

Example 22: The non-transitory computer readable medium of any of Examples 16-21, wherein the individual video streams are captured on one or more AR or VR devices and the environment video stream is captured on a server hosting a backend of the virtual environment.

Example 23: The non-transitory computer readable medium of any of Examples 16-22, wherein the individual video streams and the environment video stream are captured on a server hosting a backend of the virtual environment.

Example 24: The non-transitory computer readable medium of any of Examples 16-23, wherein the locations of the individual virtual cameras in the virtual environment are configurable.

Example 25: The non-transitory computer readable medium of any of Examples 16-24, wherein the location of the environment virtual camera in the virtual environment is configurable.

Example 26: The non-transitory computer readable medium of any of Examples 16-25, wherein the executable program instructions further configure the one or more computing devices to perform operations comprising: performing an auto frame process, by the individual virtual cameras, to automatically select one or more configuration settings.

Example 27: The non-transitory computer readable medium of any of Examples 16-26, wherein the executable program instructions further configure the one or more computing devices to perform operations comprising: performing an auto frame process, by the environment virtual cameras, to automatically select one or more configuration settings.

Example 28: The non-transitory computer readable medium of any of Examples 16-27, wherein the virtual environment includes a 3D room and the 3D avatars are in the 3D room.

Example 29: The non-transitory computer readable medium of any of Examples 16-28, wherein the video conference session and virtual environment communicate via an SDK.

Example 30: The non-transitory computer readable medium of any of Examples 16-29, wherein the individual video streams are provided through an API.

Example 31: A system comprising one or more processors configured to perform the operations of: providing a video conference session in a virtual environment including 3D avatars of one or more users; providing a plurality of individual virtual cameras in the virtual environment, each individual virtual camera capturing an individual video stream of one of the 3D avatars; providing an environment virtual camera in the virtual environment, the environment virtual camera capturing an environment video stream that includes a plurality of the 3D avatars; providing the plurality of individual video streams and the environment video stream in the video conference session; providing for display the plurality of individual video streams and the environment video stream in a video conference application.

Example 32: The system of Example 31, wherein the virtual environment comprises a VR environment.

Example 33: The system of any of Examples 31-32, wherein the virtual environment comprises an AR environment comprising one or more AR holograms.

Example 34: The system of any of Examples 31-33, wherein each individual virtual camera is locked to the corresponding 3D avatar.

Example 35: The system of any of Examples 31-34, wherein the processors are further configured to perform the operations of: providing in the virtual environment a video stream of a video conference participant.

Example 36: The system of any of Examples 31-35, wherein the environment virtual camera is located in the virtual environment at the location of a display of a video stream of a video conference participant.

Example 37: The system of any of Examples 31-36, wherein the individual video streams are captured on one or more AR or VR devices and the environment video stream is captured on a server hosting a backend of the virtual environment.

Example 38: The system of any of Examples 31-37, wherein the individual video streams and the environment video stream are captured on a server hosting a backend of the virtual environment.

Example 39: The system of any of Examples 31-38, wherein the locations of the individual virtual cameras in the virtual environment are configurable.

Example 40: The system of any of Examples 31-39, wherein the location of the environment virtual camera in the virtual environment is configurable.

Example 41: The system of any of Examples 31-40, wherein the processors are further configured to perform the operations of: performing an auto frame process, by the individual virtual cameras, to automatically select one or more configuration settings.

Example 42: The system of any of Examples 31-41, wherein the processors are further configured to perform the operations of: performing an auto frame process, by the environment virtual cameras, to automatically select one or more configuration settings.

Example 43: The system of any of Examples 31-42, wherein the virtual environment includes a 3D room and the 3D avatars are in the 3D room.

Example 44: The system of any of Examples 31-43, wherein the video conference session and virtual environment communicate via an SDK.

Example 45: The system of any of Examples 31-44, wherein the individual video streams are provided through an API.

Example 46: A method comprising: providing a video conference session in a virtual environment including 3D avatars of one or more users; receiving a plurality of individual virtual camera views of the 3D avatars from a plurality of VR or AR devices; receiving an environment virtual camera view from a server hosting a backend of the virtual environment; providing the plurality of individual virtual camera views and the environment virtual camera view in the video conference session; providing for display the plurality of individual virtual camera views and the environment virtual camera view in a video conference application.

Example 47: The method of Example 46, wherein the virtual environment comprises a VR environment.

Example 48: The method of any of Examples 46-47, wherein each individual virtual camera view is locked to a corresponding 3D avatar representing a user of a corresponding VR or AR device.

Example 49: The method of any of Examples 46-48, further comprising: transmitting to the virtual environment a video stream of a video conference participant.

Example 50: The method of any of Examples 46-49, wherein the environment virtual camera view is located in the virtual environment at the location of a display of a video stream of a video conference participant.

Example 51: A non-transitory computer readable medium that stores executable program instructions that when executed by one or more computing devices configure the one or more computing devices to perform operations comprising: providing a video conference session in a virtual environment including 3D avatars of one or more users; receiving a plurality of individual virtual camera views of the 3D avatars from a plurality of VR or AR devices; receiving an environment virtual camera view from a server hosting a backend of the virtual environment; providing the plurality of individual virtual camera views and the environment virtual camera view in the video conference session; providing for display the plurality of individual virtual camera views and the environment virtual camera view in a video conference application.

Example 52: The non-transitory computer readable medium of Example 51, wherein the virtual environment comprises a VR environment.

Example 53: The non-transitory computer readable medium of any of Examples 51-52, wherein each individual virtual camera view is locked to a corresponding 3D avatar representing a user of a corresponding VR or AR device.

Example 54: The non-transitory computer readable medium of any of Examples 51-53, wherein the executable program instructions further configure the one or more computing devices to perform operations comprising: transmitting to the virtual environment a video stream of a video conference participant.

Example 55: The non-transitory computer readable medium of any of Examples 51-54, wherein the environment virtual camera view is located in the virtual environment at the location of a display of a video stream of a video conference participant.

Example 56: A system comprising one or more processors configured to perform the operations of: providing a video conference session in a virtual environment including 3D avatars of one or more users; receiving a plurality of individual virtual camera views of the 3D avatars from a plurality of VR or AR devices; receiving an environment virtual camera view from a server hosting a backend of the virtual environment; providing the plurality of individual virtual camera views and the environment virtual camera view in the video conference session; providing for display the plurality of individual virtual camera views and the environment virtual camera view in a video conference application.

Example 57: The system of Example 56, wherein the virtual environment comprises a VR environment.

Example 58: The system of any of Examples 56-57, wherein each individual virtual camera view is locked to a corresponding 3D avatar representing a user of a corresponding VR or AR device.

Example 59: The system of any of Examples 56-58, wherein the processors are further configured to perform the operations of: transmitting to the virtual environment a video stream of a video conference participant.

Example 60: The system of any of Examples 56-59, wherein the environment virtual camera view is located in the virtual environment at the location of a display of a video stream of a video conference participant.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
providing a video conference session in a virtual environment including respective digital representations of one or more users;
providing a plurality of individual virtual cameras in the virtual environment, each individual virtual camera is associated with one of the respective digital representations and captures an individual video stream that includes the one of the respective digital representations and a portion of the virtual environment that is in a viewport of the each individual virtual camera;
providing an environment virtual camera in the virtual environment, the environment virtual camera capturing an environment video stream that includes a plurality of the respective digital representations, the environment virtual camera placed at a location within the virtual environment and having a facing direction, and the environment virtual camera not associated with any of the respective digital representations;
providing the plurality of individual video streams and the environment video stream in the video conference session; and
providing for display the plurality of individual video streams and the environment video stream in a video conference application.

2. The method of claim 1, wherein the virtual environment comprises a virtual reality (VR) environment.

3. The method of claim 1, wherein the virtual environment comprises an augmented reality (AR) environment comprising one or more AR holograms.

4. The method of claim 1, wherein each individual virtual camera is locked to the associated respective digital representation.

5. The method of claim 1, further comprising:
providing in the virtual environment a video stream of a video conference participant.

6. The method of claim 1, wherein the environment virtual camera is located in the virtual environment at the location of a display of a video stream of a video conference participant.

7. The method of claim 1, wherein the plurality of individual video streams are captured on one or more AR or VR devices and the environment video stream is captured on a server hosting a backend of the virtual environment.

8. A non-transitory computer readable medium that stores executable program instructions that when executed by one or more computing devices configure the one or more computing devices to perform operations comprising:
providing a video conference session in a virtual environment including respective digital representations of one or more users;
providing a plurality of individual virtual cameras in the virtual environment, each individual virtual camera is associated with one of the respective digital representations and captures an individual video stream that includes the one of the respective digital representations and a portion of the virtual environment that is in a viewport of the each individual virtual camera;
providing an environment virtual camera in the virtual environment, the environment virtual camera capturing an environment video stream that includes a plurality of the respective digital representations, the environment virtual camera placed at a location within the virtual environment and having a facing direction, and the environment virtual camera not associated with any of the respective digital representations;
providing the plurality of individual video streams and the environment video stream in the video conference session; and
providing for display the plurality of individual video streams and the environment video stream in a video conference application.

9. The non-transitory computer readable medium of claim 8, wherein the virtual environment comprises a VR environment.

10. The non-transitory computer readable medium of claim 8, wherein the virtual environment comprises an AR environment comprising one or more AR holograms.

11. The non-transitory computer readable medium of claim 8, wherein each individual virtual camera is locked to the associated respective digital representation.

12. The non-transitory computer readable medium of claim 8, wherein the executable program instructions further configure the one or more computing devices to perform operations comprising:
  providing in the virtual environment a video stream of a video conference participant.

13. The non-transitory computer readable medium of claim 8, wherein the environment virtual camera is located in the virtual environment at the location of a display of a video stream of a video conference participant.

14. The non-transitory computer readable medium of claim 8, wherein the plurality of individual video streams are captured on one or more AR or VR devices and the environment video stream is captured on a server hosting a backend of the virtual environment.

15. A system comprising one or more processors configured to perform the operations of:
  providing a video conference session in a virtual environment including respective digital representations of one or more users;
  providing a plurality of individual virtual cameras in the virtual environment, each individual virtual camera is associated with one of the respective digital representations and captures an individual video stream that includes the one of the respective digital representations and a portion of the virtual environment that is in a viewport of the each individual virtual camera;
  providing an environment virtual camera in the virtual environment, the environment virtual camera capturing an environment video stream that includes a plurality of the respective digital representations, the environment virtual camera placed at a location within the virtual environment and having a facing direction, and the environment virtual camera not associated with any of the respective digital representations;
  providing the plurality of individual video streams and the environment video stream in the video conference session; and
  providing for display the plurality of individual video streams and the environment video stream in a video conference application.

16. The system of claim 15, wherein each individual virtual camera is locked to the associated respective digital representation.

17. The system of claim 15, wherein the processors are further configured to perform the operations of:
  providing in the virtual environment a video stream of a video conference participant.

18. The system of claim 15, wherein the plurality of individual video streams are captured on one or more AR or VR devices and the environment video stream is captured on a server hosting a backend of the virtual environment.

19. The system of claim 15, wherein the video conference session and the virtual environment communicate via a software development kit (SDK).

20. The system of claim 15, wherein the plurality of individual video streams are provided through an application programming interface (API).

* * * * *